United States Patent [19]

Dawes

[11] Patent Number: 4,988,019

[45] Date of Patent: Jan. 29, 1991

[54] COMPACT PORTABLE DISPENSING SYSTEM FOR EDIBLES SUCH AS TEA

[76] Inventor: Charles R. Dawes, 4885 Gray St., Denver, Colo. 80212

[21] Appl. No.: 386,728

[22] Filed: Jul. 31, 1989

[51] Int. Cl.$^5$ .............................................. B67D 5/58
[52] U.S. Cl. ................................. 222/189; 222/386; 99/287; 100/54; 100/132; 100/213; 206/0.5
[58] Field of Search .................. 222/189, 386; 99/287; 206/0.5; 100/54, 56, 60, 132, 133, 213, 131

[56] References Cited

U.S. PATENT DOCUMENTS

| | | | |
|---|---|---|---|
| 519,108 | 5/1894 | Fontneau | 99/287 |
| 1,835,966 | 12/1931 | Pochyla | 100/213 X |
| 2,285,113 | 6/1942 | Eaton | 99/287 X |
| 2,678,000 | 5/1954 | Scheidt | 99/287 X |
| 2,986,269 | 5/1961 | Goldberg | 206/0.5 |
| 4,417,504 | 11/1983 | Yamamoto | 206/0.5 |
| 4,602,557 | 7/1986 | Yip | 206/0.5 |

FOREIGN PATENT DOCUMENTS

| | | | |
|---|---|---|---|
| 1069878 | 7/1954 | France | 99/287 |
| 22650 | 9/1910 | United Kingdom | 99/287 |

*Primary Examiner*—Andres Kashnikow
*Assistant Examiner*—Gregory L. Huson

[57] ABSTRACT

The present invention relates to a new and improved system design associated with the storage and/or utilization of any edible such as tea, coffee, soups, and the like, that is contained in a bag structure. The invention defines a compact enclosure capable of providing air tight packaging, whereupon, removal of the lid of the packaging enclosure of the device allows for the removal of the straining container and the edible contained within the bag structure. The bag structure has affixed to the free end of a string attached to the bag structure, a disk member whose dimensions are compatible, with the opening appearing in the straining container contained within the packaging enclosure. The straining container additionally has formed through the bottom portion thereof, holes to allow for the passage of a liquid squeezed from said bag structure in accordance with the invention.

8 Claims, 2 Drawing Sheets

COMPACT PORTABLE DISPENSING SYSTEM FOR EDIBLES SUCH AS TEA

BACKGROUND AND OBJECTS OF THE INVENTION

The present invention relates to a new and improved system design associated with the storage and/or utilization of any edible such as tea, coffee, soups, and the like, wherein a compact enclosure capable of providing air tight packaging for the edible contained within a bag structure, along with its component parts, achieves efficiency and uniqueness with regard to utilization of the edible, whereupon, removal of the lid of the packaging enclosure of the device allows for the removal of the straining container and edible contained within the bag structure in question which is contained therein, the bag structure having affixed to the free end of a string attached to the bag structure, a disc member whose dimensions are compatible with the opening appearing in the straining container contained within the packaging enclosure, the straining container having formed through the bottom portion thereof, holes to allow for the passage of a liquid squeezed from said bag structure in accordance with the invention.

In conjunction with the above, it should be noted that prior art devices exist related to utilization of a tea bag in conjunction with various forms of packaging and/or containers as related to the utilization of said tea bag as well as providing means to assist in the implementation thereof, both based upon convenience as well as neatness.

Reference is herein made to the prior art devices which are representative of the state of the art prior as related to the present invention, to wit, U.S. Pat. No. 2,199,406, issued to Olga Jablon, dated May 7, 1940, U.S. Pat. No. 2,839,406, issued to Martin B. Steinthal, dated June 17, 1958, U.S. Pat. No. 3,379,331, issued to Rosalind G. Kamlet, dated Apr. 23, 1968; and U.S. Pat. No. 3,935,318, issued to Sergio Milhailide, dated Jan. 27, 1976.

In conjunction with the above, it is respectively submitted that the present invention is not anticipated, taught nor disclosed by the prior art either as referred to above, or otherwise, and in fact, the present invention seeks to address and otherwise overcome various problems not addressed by the prior art device.

In conjunction with the above, and in keeping with the invention, it is, therefore, an object of the present invention to create a new and novel tea bag system that overcomes the various problems and disadvantages inherent in the prior art devices evidenced to date.

It is another object of the present invention to create a new and novel compact dispensing system capable of having contained within one compact unit a packaging system for an individual tea bag or other edible contained with a bag which utilizes a straining container self-contained within and otherwise compatible with the packaging container of said system whereby through the openings formed in the bottom of said straining container there is achieved the ability to compress all liquid out of the tea bag or other edible contained within a bag after it has been utilized in accordance with the invention by use of the dual functioning disc member which is attached to the free end of the string attached to said tea bag or other edible contained within the bag.

It is another object of the present invention to create a new and novel compact dispensing system which is capable of reusability of the lid of the packaging enclosure along with said packaging enclosure to allow for a resealing of the container to provide an air tight, leak proof and sterile environment whereby a tea bag or other edible contained within a bag, once used, can be repackaged by said user for purposes of future reuse.

It is another object of the present invention to create a new and novel compact dispensing system wherein the disc member of said system is fabricated from Styrofoam or other comparable material capable of floating within a liquid so that in the eventuality said disc member is accidentally dropped into the cup during utilization, said disc member readily floats on the surface of said liquid and is easily retrievable.

It is another object of the present invention to create a new and novel compact dispensing system wherein the disc member is capable of having implanted thereon data either of advertising and/or promotional nature, or otherwise.

It is another object of the present invention to create a new and novel compact dispensing system wherein the disc member is readily removeable from the string by which said disc member is attached to said bag so as to allow for the selective retention and/or separating of said disc member from the bag in question.

It is another object of the present invention to create a new and novel compact dispensing system which provides a convenient disposable means whereby a utilized bag can be discarded without dripping or staining the surrounding environment in which it is utilized.

It is another object of the present invention to create a new and novel compact dispensing system wherein there is achieved efficiencies in design and implementation inherent in the invention not set forth int eh prior art.

The objects and advantages of the invention are set forth in part herein and in part will be obvious herefrom, or may be learned by practice of the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

The present invention relates to a new and improved system design associated with the storage and/or utilization of any edible such as tea, coffee, soups, and the like, wherein a compact enclosure capable of providing air tight packaging for the edible contained within a bag structure, along with its component parts, achieves efficiency and uniqueness with regard to utilization of the edible, whereupon, removal of the lid of the packaging enclosure of the device allows for the removal of the straining container and edible contained within the bag structure in question which is contained therein, the bag structure having affixed to the free end of a string attached to the bag structure, a disc member whose dimensions are compatible with the opening appearing in the straining container contained within the packaging enclosure, the straining container having formed through the bottom portion thereof, holes to allow for the passage of a liquid squeezed from said bag structure in accordance with the invention.

The accompanying drawings referred to herein and constituting a part hereof are illustrative of the invention but not restrictive thereof, and, together with the description serve to explain the principals of the invention.

DESCRIPTION OF A PREFERRED EMBODIMENT

Figure 1:
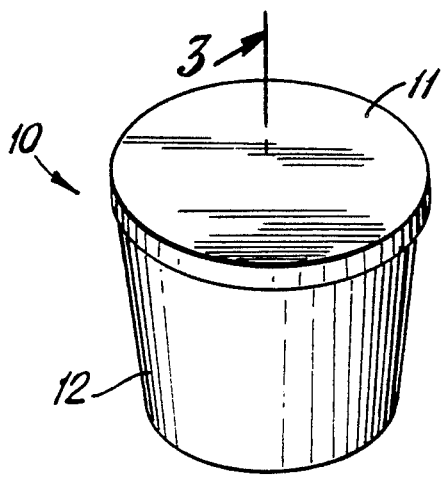
FIG. 1 is a three dimensional perspective view of the compact dispensing system constructed in accordance with the invention evidencing a tea bag intact within said packaging system constructed in accordance with this invention.

Referring now more particularly to the embodiment of the above invention illustrated in the accompanying drawings, there is illustrated in FIG. 1 a three dimensional perspective view of the compact dispensing system constructed in accordance with the invention, same being generally indicated by numerical designation 10.

Figure 2:
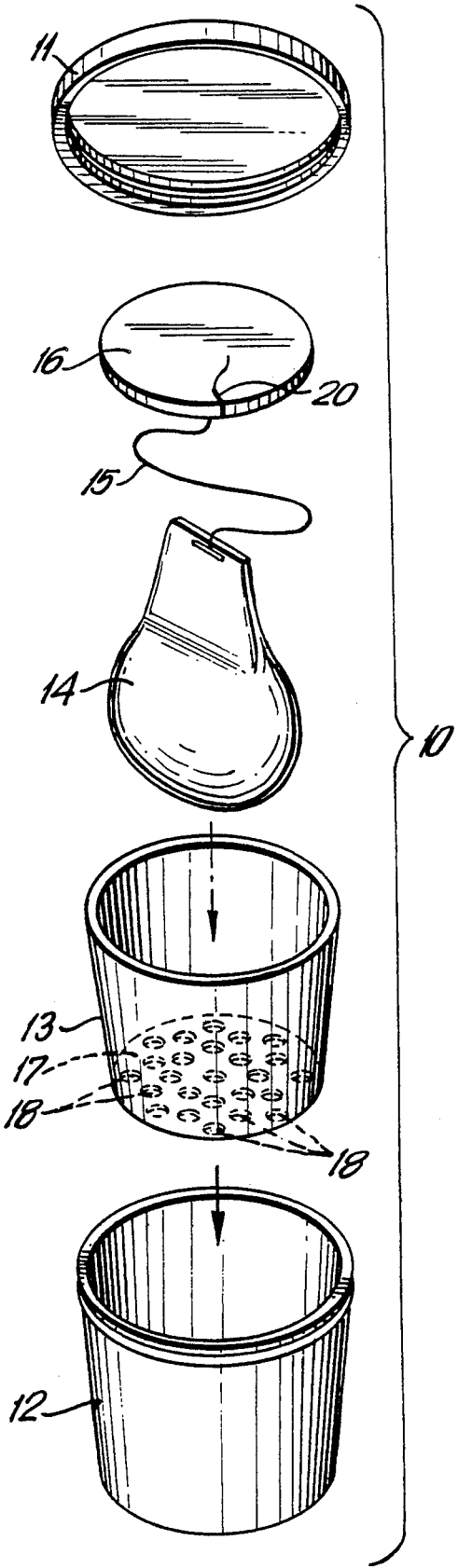
FIG. 2 is an exploded three dimensional perspective view evidencing the individual components of said compact dispensing system constructed in accordance with the invention.

Additionally, and as set forth in FIG. 2 of the drawings, there is depicted an exploded three dimensional perspective view of compact dispensing system 10 as illustrated in FIG. 1, however, said individualized components have been removed from compact dispensing system 10 as depicted in FIG. 1 and are illustrated in their individualized capacities.

As depicted in FIG. 2, compact dispensing system 10 comprises in the preferred embodiment therein set forth, six individualized components, same being as follows, to wit, a lid member 11 which forms the cover to packing enclosure 12, straining container 13, tea bag 14, string member 15 and disc member 16.

Figure 3:
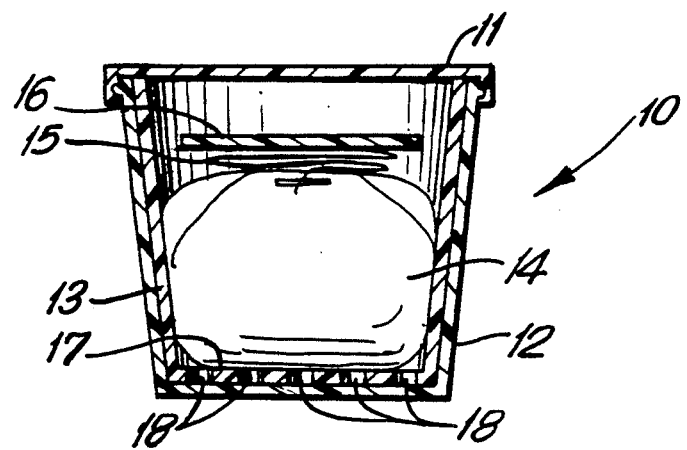
FIG. 3 is a vertical cross-sectional view taken along lines 3—3 of FIG. 1.

In keeping with the invention, lid member 11 is capable of mechanical interfit with packing enclosure 12 so as to provide an air tight seal such that lid member 11 can be selectively removed form packing enclosure 12, either so as to get access to the remaining components of compact dispensing system 10 which initially are packaged therein as illustrated in FIG. 3, or in the alternative, to be utilized in accordance with the invention after the utilization of tea bag 14 so as to provide a compact and unique air tight storage and/or disposable means whereby a utilized tea bag is conveniently retained for future reuse in an air tight environment or is packaged so as to be thrown away without staining, dripping upon, or otherwise disturbing the surroundings in which said compact dispensing system 10 is utilized.

In further keeping with the invention, straining container 13 is structured so as to allow for its mechanical interfit within the dimensions of packing enclosure 12, it being envisioned within the scope of this invention, for straining container 13 to be of a similar geometrical configuration as that of packing enclosure 12, however, straining container 13 having dimensions slightly less in size than the comparable dimensions of packing enclosure 12 such that straining container 13 can be compatibly placed within packing enclosure 12 as illustrated in FIG. 3. As illustrated in the drawings, straining container 13 and packing enclosure 12 are conical respectively in shape in accordance with the above.

Figure 4:
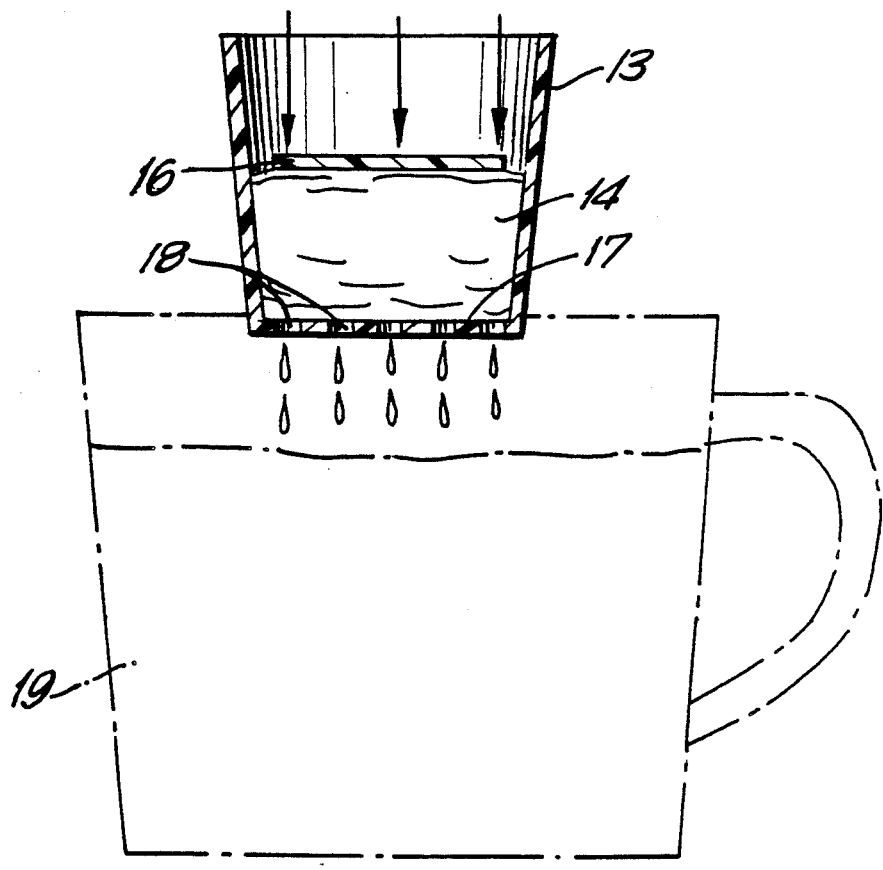
FIG. 4 is an enlarged vertical cross-sectional view of a tea bag after utilization as it would be placed into the compact dispensing system's straining container for straining in accordance with the invention.

As further illustrated in FIGS. 2, 3 and 4, straining container 13 has formed through its bottom surface 17 openings 18, so as to allow for the passage therethrough of a liquid.

As further illustrated in FIG. 2, tea bag 14 has affixed to it, string member 15, the end thereof which is not structurally affixed to tea bag 14 being structurally affixed to disc member 16 by having said loose end of string member 15 threaded through slit 20 formed through disc member 16, disc member 16 being of a shape, design and having dimensions compatible with straining container 13 such that, as illustrated in FIGS. 3 and 4, disc member 16 is capable of placement within straining container 13 so as to be pressed against tea bag 14 (FIG. 4) so as to cause liquid within tea bag 14 to be drained therefrom such that said liquid is capable of passing through openings 18 and into cup 19 as illustrated in FIG. 4.

It should further be noted that, in keeping with the invention, disc member 16, in its preferred embodiment, is to be fabricated from Styrofoam or any other material capable of floating within a liquid, it being within the scope of this invention not to limit the material from which disc member 16 is fashioned to that of only Styrofoam.

Furthermore, in conjunction with disc member 16, it should further be noted that disc member 16 can be structurally affixed to string member 15 in any manner or fashion well known within the prior art, however, the preferred method as illustrated in FIG. 2 and in keeping with the invention is the utilization of slit 20 formed within disc member 16. In the context of the above, the above detachability of disc member 16 from string member 15 is consistent with and in keeping with the invention whereby imprinted data upon disc member 16 can be utilized for advertising or a promotional basis or addressed to having collectible items depicted thereon.

Although specific shapes, contours and geometric figures are illustrated for the various components of compact dispensing system 10 as illustrated in the drawings, nothing herein should be construed as to limit the invention to said particular shapes, contours and geometric figures as illustrated in said drawings, but rather, any variations thereon are possible as long as the interrelationship between components as hereinabove set forth are maintained.

More particularly, in place of having lid member 11 be circular, packing enclosure 12 be cylindrical straining container 13 be cylindrical, and disc member 16 be circular, it is within the scope of this invention that lid member 11, packing enclosure 12, straining container 13 and disc member 16 could define rectangular shapes, triangular shapes, square shapes, pentagonal shapes, hexagonal shapes, etc., the invention not being limited to any one specific shape. What is, however, inherent in the invention, is the compatible interrelationship as far as shape is concerned as related to lid member 11, packing enclosure 12, straining container 13 and disc member 16.

It should additionally be noted that although the description herein contained as related to the preferred embodiment of the invention addressed itself to its utilization with a tea bag, nothing herein contained should be considered to so limit the scope of the invention to be applicable only to tea. More particularly, it is within the scope of this invention that the structure and utilization as herein defined is applicable to any substance that can be commercially exploited in place of tea being contained in the bag designated by reference number 14, such alternative substances being, instant coffee, instant soups or any other food product that merely needs to be mixed with liquid for its preparation.

The preceding description and accompanying drawings relate primarily to a specific embodiment of the invention, and the invention in its broader aspect should not be so limited to one specific embodiment as herein shown and described, but departures may be made therefrom within the scope of the accompanying claims without departing from the principals of the invention and without sacrificing its chief advantages.

I claim:

1. A compact, portable, disposable dispensing system for edibles capable of providing air tight packaging comprising;
   (a) a lid member;
   (b) a packing enclosure defining a cavity wherein said packaging enclosure is capable of mechanical interfit in an air tight manner with said lid member;
   (c) a straining container capable of close mechanical interfit within the cavity formed in said packaging enclosure wherein the geometry of said straining container corresponds to the geometric shape defined by the interior structural portion of said packing enclosure that defines said cavity therein, and additionally defining therein its own cavity, said straining container being sized so as not to prevent the mechanical interfit between said packing enclosure and said lid member, said straining container further having formed within the bottom portion of its structure openings capable of allowing for the flow of liquid therethrough;
   (d) a tab member in the form of a disk member capable of being passed a desired distance into the cavity formed within said straining container;
   (e) a liquid permeable bag member containing therein an edible substance, said bag member capable of being contained within the cavity formed within said straining container; and
   (f) a string member having one end thereof structurally affixed to said bag member and the other end thereof mechanically affixed to said tab member, wherein during the use thereof the user can place said bag member into said straining container, said bag member being compressible against the bottom of said straining container by said tab member so as to allow a flow of liquid therethrough, thus enhancing the extraction of said edible substance.

2. A compact dispensing system as defined in claim 1 wherein the edible substance contained in said bag member is tea.

3. A compact dispensing system as defined in claim 1 wherein the edible substance contained in said bag member is coffee.

4. A compact dispensing system as defined in claim 1 wherein the edible substance contained in said bag member is soup.

5. A compact dispensing system as defined in claim 1 wherein said tab member defines a rigid structure.

6. A compact dispensing system as defined in claim 1 above wherein said packaging enclosure defines a truncated conical shape.

7. A compact dispensing system as defined in claim 1 wherein said disk member is of a circular configuration.

8. A compact dispensing system as defined in claim 7 wherein said disk member is fabricated from floatable material.

* * * * *